United States Patent [19]
Werner et al.

[11] Patent Number: 5,220,259

[45] Date of Patent: Jun. 15, 1993

[54] DC MOTOR DRIVE SYSTEM AND METHOD

[75] Inventors: Neal A. Werner, Plymouth; Gary W. Box, Golden Valley, both of Minn.

[73] Assignee: Graco Inc., Minneapolis, Minn.

[21] Appl. No.: 770,554

[22] Filed: Oct. 3, 1991

[51] Int. Cl.[5] .............................................. H02P 7/06
[52] U.S. Cl. .................................... 318/432; 318/434
[58] Field of Search ............... 318/138, 254, 432, 433, 318/434, 439

[56] References Cited

U.S. PATENT DOCUMENTS 4,628,499 12/1986 Hammett ............................. 364/167
5,034,671 7/1991 Patton et al. ........................ 318/560

Primary Examiner—Bentsu Ro
Attorney, Agent, or Firm—Palmatier, Sjoquist & Helget

[57] ABSTRACT

A DC motor drive system for providing an enhanced motor speed/torque relationship, where circuits modify the motor field winding control switching sequence to compensate for speed effects on motor torque output and to compensate on transient loading effects on motor torque output, and to compensate for rotor inertial effects caused by transient motor load changes.

25 Claims, 10 Drawing Sheets

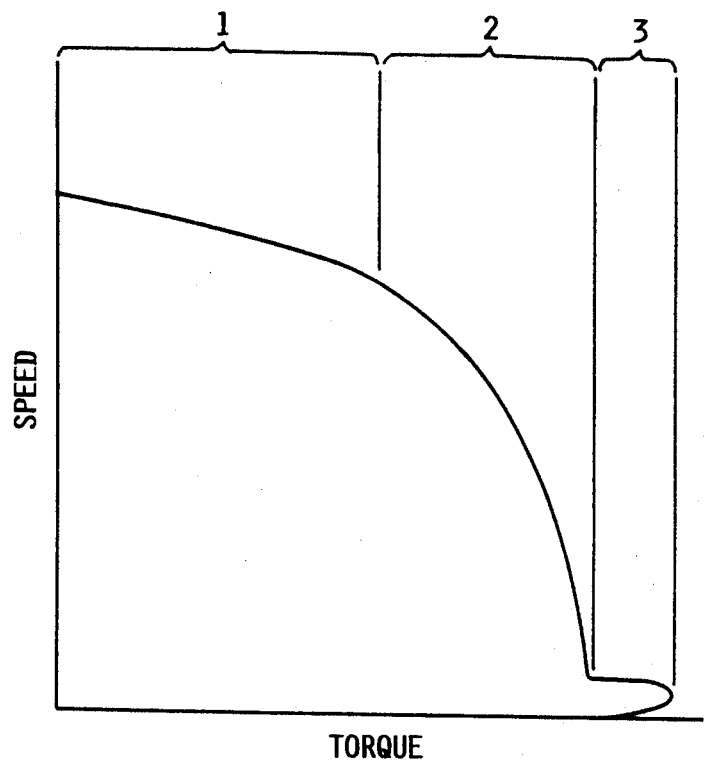
FIG. IA (PRIOR ART)
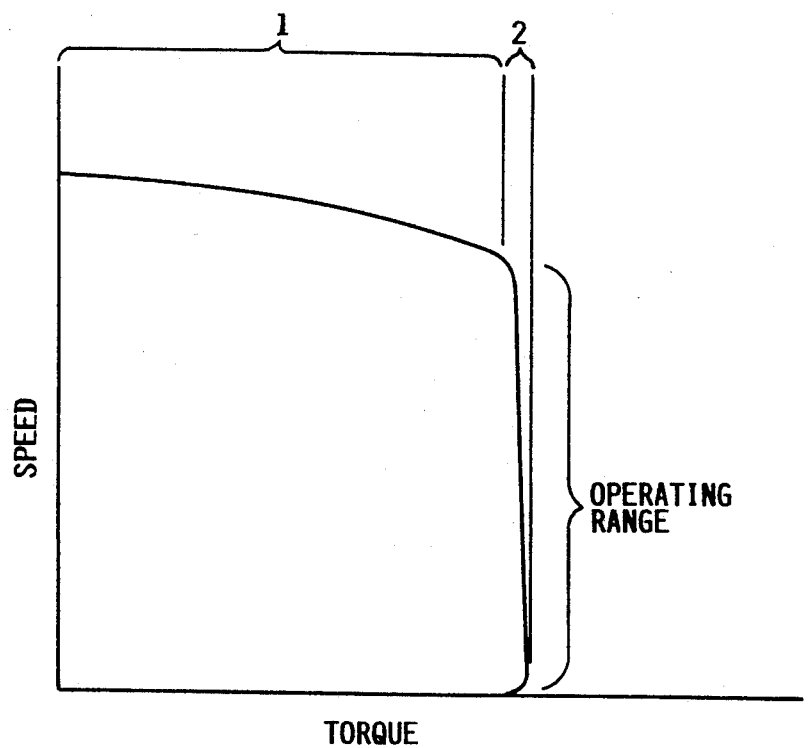
FIG. IB

DC MOTOR DRIVE SYSTEM AND METHOD

BACKGROUND OF THE INVENTION

The present invention relates to a DC motor drive system and method for controlling motor output torque. More particularly, the invention relates to a DC motor drive system which is mechanically connected to drive a linearly-reciprocable liquid pump.

In the prior art, linearly-reciprocable liquid pumps have most often been mechanically coupled to air motor drive systems; an obvious advantage in utilizing an air motor drive system lies in the fact that an air motor can be constructed to operate in a linearly-reciprocable fashion, with movement and position matched to the characteristics of the pump. In typical systems, the linear pump is driven over a predetermined stroke distance, whereupon its direction of travel is changed and it is driven in the reverse direction over the same predetermined stroke distance. The pump typically has two internal chambers so that it may discharge liquid from one of these chambers during the length of its stroke, while at the same time it is receiving liquid into the other of its chambers; therefore the pump both discharges and receives liquid during both the forward and reverse travel of a stroke. An air motor driver may be constructed to impart driving force in the forward and reverse directions, over a stroke which is matched to the pump delivery stroke. The interval of time and distance wherein the pump changes its stroke direction is called the "changeover," and with an air motor driving system there is typically a small pressure change evident in the liquid delivered by the pump during the changeover. However, this pressure change is usually quite small, because an air motor has low inertia and is able to move through the changeover cycle fairly quickly; i.e., an air motor has very little inertia or stored energy to dissipate during the changeover. At or near the time of changeover the liquid check valves in a reciprocable pump also contribute to the pressure changes which are evident during the changeover interval. The overall changeover effect is a sharp pressure drop followed immediately by a pressure surge, but the low inertia of an air motor driver causes this pressure perturbation to be quickly corrected. However, when a reciprocable pump is driven by a torque-controlled electric motor system, the inertia of the motor system magnifies these pressure perturbations, creating a longer pressure drop and a higher pressure surge during the changeover interval. This has long been considered a disadvantage in using electric torque-controlled motor systems for this purpose.

Another advantageous feature of utilizing a linear air motor to drive a linearly-reciprocable pump is the ability of the air motor to "stall" whenever the liquid output pressure becomes sufficiently high to counterbalance the air pressure applied to the air motor. This feature is particularly important in systems wherein liquid flow may be intermittently turned on and off, such as in liquid delivery or paint delivery systems. When the liquid flow valve is suddenly shut off, the air motor will stop any further drive motion as soon as the blocked liquid pressure becomes equalized to the air motor driving pressure, and the air motor will remain in the stalled condition until such time as the liquid flow valve is again opened.

Among the disadvantages of utilizing an air motor driving system is in the fact that an external source of air pressure is required, and such systems tend to be relatively energy-inefficient. As a result of these and other disadvantages, other forms of motor drive systems have been designed for mechanically connecting to linearly-reciprocable pumping systems. Electric motor drive systems have been tried in this application, with electrical controls to regulate the motor driving speed as a function of either liquid pressure or volume flow. Electrical cut-off switches have been devised to disconnect the electrical power to such a motor when conditions of blocked pressure are encountered, and DC motor drive systems have been devised wherein the motor is permitted to go into a stall condition with a reduced level, constant current being applied to the motor to produce a motor torque which counterbalances the block pressure in the pump delivery system.

A disadvantage in the use of a DC motor to drive a linearly-reciprocable pump lies in the fact that the DC motor typically has a very high inertia or stored energy which becomes a problem during changeover of the pump from one stroke direction to the other. During pump changeover, the liquid pressure typically momentarily drops, resulting in a sudden increase in motor speed; thereafter, the increased motor speed develops an increased pressure which is felt as a pressure surge in the pump delivery system at the completion of the changeover cycle. Therefore, pressure spikes occur during each changeover cycle, which can degrade the liquid delivery characteristics which are desired in any given system. When liquid flow valves in the system are turned on and off, pressure variations inherently occur as a result of the motor inertia, resulting in pressure and flow surges which disturb the relatively smooth liquid flow characteristics desired from the system.

The present invention provides an energy management technique for controlling a DC motor drive system of the type described, to prevent over pressurization of the liquid delivery system. The invention provides an apparatus and method for driving the apparatus, which absorbs the kinetic energy of the motor rotor electrically whenever the liquid flow stops, and limits the speed increase of the motor during liquid pump changeovers. The invention also enables a reduction in power consumption of the system under blocked pressure conditions, by selectively reducing the electrical motor drive power during such conditions.

SUMMARY OF THE INVENTION

The invention comprises a DC motor drive control circuit utilizing a current sensor to monitor the motor current/torque, and a set-point control to enable a manual setting for desired current/torque. The motor speed and position is monitored by an encoder, and a microprocessor is connected to the monitoring and sensing devices, and to the motor drive control circuit. The cooperating features of the invention produce an improved motor speed/torque characteristic which more closely approaches idealized motor speed/torque operating conditions, to produce a constant motor torque under widely diverse operating conditions. The circuits of the present invention also reduce the current load requirements of the motor drive circuit, to enhance the overall motor drive current efficiency. The method of operating the motor drive control circuit is controlled the microprocessor in any of six operational states. The microprocessor controls motor drive current under initial motor-stalled conditions, under extended motor-stalled conditions, under initial liquid flow conditions, under linear pumping conditions, under pump changeover conditions, and under abrupt pumped liquid flow interruption conditions.

It is a principal object of the present invention to provide a DC motor control system for driving a liquid pumping system under conditions of uniform liquid pressure.

It is another object of the present invention to provide a DC motor control system under reduced power requirements from that known in the prior art.

It is another object and advantage of the present invention to provide a DC motor control system to minimize pressure surges in the liquid delivery system during pump changeover and during intervals of interrupted liquid flow in the system.

The foregoing and other objects and advantages of the invention will become apparent from the following specification and claims, and with reference to the appended drawings.

BRIEF DESCRIPTION OF THE DRAWINGS

FIG 1A shows a conventional motor speed/torque curve;

FIG. 1B shows the motor speed/torque curve produced by the present invention;

DESCRIPTION OF THE PREFERRED EMBODIMENT

Referring first to FIG. 1A, there is shown a conventional motor torque/speed curve. Region 1 of this curve is essentially governed by the physical characteristics of the motor itself, and cannot be significantly alterred once the particular motor design is chosen. In this region, an increase in motor torque will result in a nearly linearly corresponding decrease in motor speed. Region 2 of the curve is generally characterized as an operating region wherein increased torque loading of the motor results in a precipitous and generally exaggerated reduction in motor speed. The average internal motor drive currents increase correspondingly with torque, but produce a progressively slower motor speed. Region 3 of the curve is a severe overload region of operation, wherein high increases in torque (and current) occur while motor speed drops to zero, characterized as a "stall" condition. The fold-back characteristic of this portion of the curve is due to the torque ripple of the motor, and the motor stalls where the rotor delivers a minimum torque with a constant current.

FIG. 1B shows a motor speed/torque characteristic which is achieved with the present invention, wherein region 1 is still dependent upon the motor design characteristics. Region 2 is a nearly idealized vertical line, indicating the motor will deliver substantially constant torque over a wide operating range of speed conditions. Region 3 of the conventional drive characteristics is virtually eliminated with the present invention.

Figure 2:
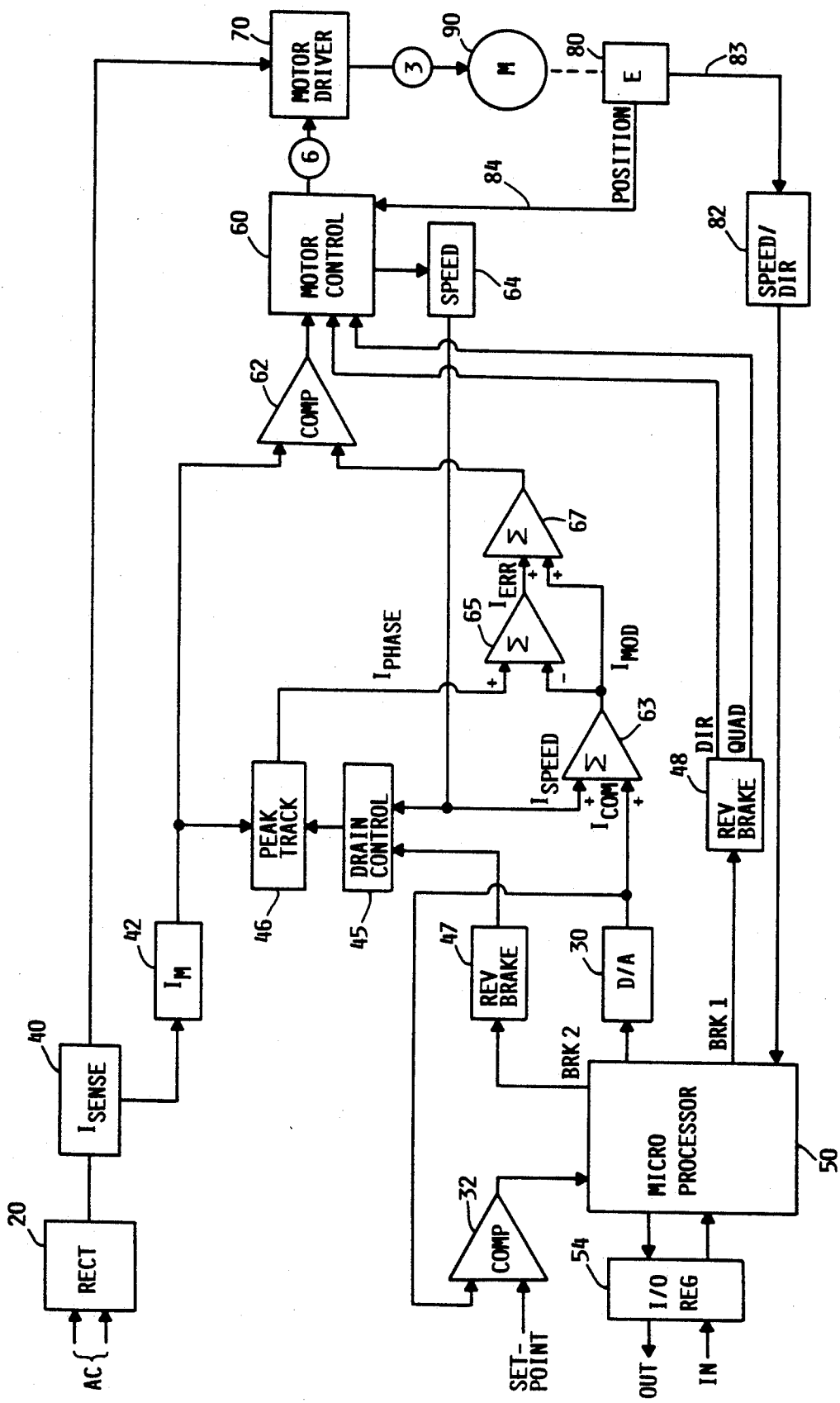
FIG. 2 shows an overall block diagram of the present invention.

FIG. 2 shows an overall block diagram of the present invention. This figure may be referred to throughout the following specification to properly reference the particular circuits of the invention which are described in greater detail herein. FIG. 2 illustrates, in block diagram form, the interconnection of the various circuits to be described herein, and shows the overall layout of the apparatus form of the invention. Certain of the boxes shown in FIG. 2 are not described in detail herein, as they are represented by conventional, commercially-available components. For example, rectifier circuit 20 is a conventional single phase rectifier for converting an alternating current voltage into a direct current (DC) voltage, for current delivery demands of the particular motor selected for use with the invention. Rectifier circuit 20 includes a large capacitance across the DC voltage line for energy storage. The preferred embodiment utilizes two 1400 microfarad (uf) capacitors connected in parallel for this purpose. D/A converter 30 may be a commercially-available 10-bit digital-to-analog converter, as for example a product manufactured by Analog Devices Corporation. Current sensor 40 is preferably a current sensor type designation IHA-100, manufactured by F. W. Bell Company. Microprocessor 50 may be a commercially-obtainable product such as an Intel Processor Type 87C51. I/O drivers 54 may be made from conventional, commercially-available RS232 driver/receiver semiconductors. Motor control 60 is a circuit chip design manufactured by Unitrode, under Type Designation UC1625.

A suitable alternating current source is connected to rectifier 20, the output of which produces a filtered DC voltage and direct current. The current is passed through the current sensor 40, and thence to motor driver circuit 70. The current is delivered to motor 90 via three winding phases to be hereinafter described. Motor 90 is coupled to a shaft encoder 80, which delivers a motor position signal over line 84 to motor control circuit 60, and a signal over line 83 to speed/direction circuits 82. The speed/direction circuits 82 deliver digital representations of speed and direction to microprocessor 50.

The current sensed by current sensor 40 is monitored by current monitoring circuits 42. Current monitoring circuits 42 deliver an output signal to peak tracking circuits 46 and a comparator 62. Peak tracking circuits 46 also receive an input from drain control circuits 45, which input signal is a function of the motor speed information. Drain control circuits 45 receive input signals from average speed circuit 64 and reverse braking circuits 47. Reverse braking circuits 47 receive an input from microprocessor 50. Average speed circuit 64 receives its input from motor control circuit 60, and also transmits an output signal to current command summer circuit 63.

An operator-adjustable set-point signal is coupled to a set-point comparator 32, which also receives an input from D/A converter 30. The output from set-point comparator 32 is connected to microprocessor 50. The operator set-point signal is developed via the feedback loop consisting of comparator 32, microprocessor 50, and D/A converter 30. A binary counter in microprocessor 50 develops an output signal which is coupled into D/A converter 30, and D/A converter 30 develops an analog output voltage which is representative of this input binary signal. This output voltage is coupled into comparator 32, to be compared with the actual set-point voltage. If the two voltages do not compare, comparator 32 develops a signal which is fed into microprocessor 50 to increase or decrease the count to a different value. When the count value, after conversion by D/A converter 30 equals the actual set-point signal, comparator 32 generates a signal to microprocessor 50 to discontinue any further adjustment of the binary counter. As a result thereof, microprocessor 52 retains a digital representation of the set-point value, and this value is converted to an analog voltage representation for use in the analog circuits of FIG. 2. The D/A converter analog output voltage signal is processed via three summing circuits 63, 65 and 67, and is delivered in modified form to a comparator circuit 62, which compares the signal with the output from the current monitoring circuits 42, to generate a control signal to motor control circuit 60. Microprocessor 50 also provides a "BRK 1" signal to reverse braking circuits 48, which circuits convert this signal to a directional (DIR) and quadrature (QUAD) signal, each of which are transmitted to motor control circuit 60, and microprocessor 50 also provides a "BRK 2" signal to reverse braking circuits 47. Microprocessor 50 receives binary on/off signals from speed/direction circuits 82, which are coupled to opto-interrupter signals generated by encoder 80 via lines 83. These signals enable microprocessor 50 to calculate the speed of motor 90 and to calculate the rotational direction of motor 90; as a result, microprocessor 50 is also able to calculate the acceleration or deceleration of motor 90, which it utilizes to develop the "BRK 1" and "BRK 2" signals. Microprocessor 50 is also connected to an input/output (I/O) register 54, which is comprised of conventional RS232 circuits, to enable microprocessor 50 to communicate with external digital devices and computer processors.

Figure 3A:
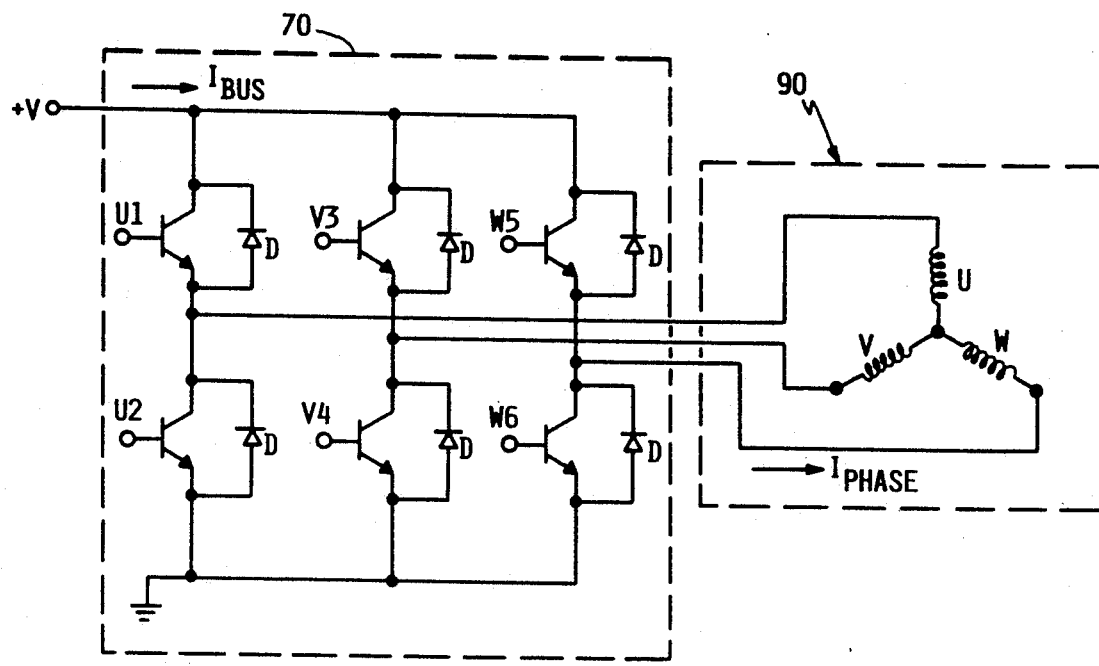
FIG. 3A shows a schematic diagram of the motor driver circuit and motor.

Referring next to FIG. 3A, a schematic diagram of motor (M) 90 and motor driver circuits 70 is illustrated. This schematic diagram is representative of typical torque-controlled brushless DC motors, wherein the motor windings are arranged into three phases U, V, and W. The respective motor windings are each connected to a dual transistor leg, wherein motor winding U is connected intermediate transistors U1 and U2; motor winding V is connected intermediate transistors V3 and V4; motor winding W is connected intermediate transistors W5 and W6. Circuit 70 constitutes a three-phase inverter circuit, wherein two of the six transistors illustrated are turned on at any given time to conduct current through the various motor windings. Each of the transistors U1, U2, V3, V4, W5, and W6 has a reverse-biased diode D connected in parallel. The diodes D each selectively become forward biased during portions of the motor driving sequence to be hereinafter described.

Figure 3B:
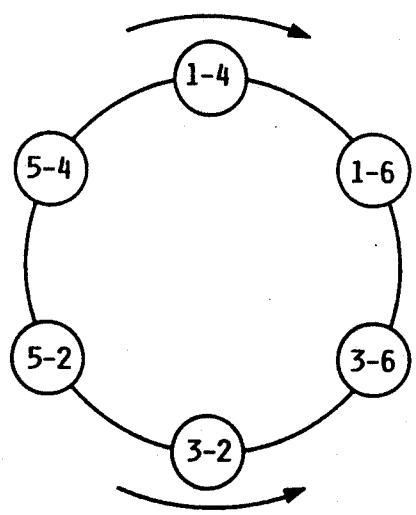
FIG. 3B shows the motor commutation sequence.

The selection of which two transistors of the circuit 70 to turn on at any given time is made by the motor control circuit 60, according to the position of the rotor of the motor. The selection process is called commutation, and a particular sequence is followed to ensure a positive torque from the motor under either forward or reverse driving conditions. The commutation sequence is illustrated in FIG. 3B, wherein each pair of numbers identified within a small circle corresponds to the transistor identification of FIG. 3A. The time during which any two transistors may be selected is defined as the commutation period; the length of time within a commutation period when transistors are actually turned on determines the average current flow through the windings, and therefore determines the torque which is delivered by the motor 90. Under "2-QUAD" practical operating conditions, one of the two transistors selected during any commutation period is typically left on during the entire commutation period, and the other of the two transistors is selectively turned on for a portion of the period, depending upon the current demand requirements for the motor. This selective turn-on is referred to as "chopping" and is controlled by simply applying a controlled drive signal to a transistor for a selected time interval. Referring to FIGS. 3A and 3B, a typical operating sequence for forward drive of the motor is readily ascertainable. For example, during the first commutation period transistor turn-on signal U1 is applied and transistor signal V4 is selectively applied during the chopping interval; this produces current flow through windings U and V. During the next commutation period transistor drive signal U1 remains on and drive signal W6 is selectively turned on during the chopping interval; this produces motor drive current through windings U and W. During the next commutation period transistor drive signal V3 is turned on and transistor drive signal W6 is selectively turned on during the chopping interval; this produces motor drive current through windings V and W. During the next commutation period transistor drive signal V3 is turned on and drive signal U2 is selectively turned on during the chopping interval; this produces drive current through motor windings V and U. During the next commutation period transistor drive signal W5 is turned on and transistor drive signal U2 is selectively turned on during the chopping interval; this produces motor drive current through windings W and U. During the next commutation period transistor drive signal W5 is turned on and transistor drive signal V4 is selectively turned on during the chopping interval; this produces motor drive current through windings W and V. The sequence then repeats itself as described herein. For reverse drive of the motor the sequence of signals is reversed as shown in FIG. 3B.

Under "4-QUAD" operating conditions, both of the two transistors selected during any commutation period are turned on and off coincidentally. This type of operation is particularly useful in connection with the present invention, as will be hereinafter described.

During operation of the motor according to the commutation sequence described above, a back-EMF is developed in the motor windings which is proportional to the rotor speed. This back-EMF opposes the current flow into the motor windings, and affects the operation of the motor in different ways, depending upon which of the operating regions of FIG. 1A that the motor is driven. For example, in region 1 the motor speed is high and the back-EMF is relatively large. The phase current through the motor is therefore reduced and the resultant output torque is correspondingly reduced. As the motor speed decreases the phase current through the windings increases toward whatever set-point current value has been selected at a particular operating point. However, because of the commutation sequence, the phase current never quite reaches the current set point, therefore the motor drive circuit is not required to perform any "chopping" throughout region 1 of FIG. 1A.

In region 2 the motor speed is sufficiently low to reduce the back-EMF so that a larger phase current flows through the windings. In this region, the average phase current does increase to the set point as the motor speed decreases. Therefore, various degrees of "chopping" are required in order to control the operation to the set point selected for the motor.

In region 3 the motor speed is so slow that the back-EMF approaches zero, resulting in very little opposition to phase current. The phase current therefore moves above the set point selected for the motor and a significant amount of chopping occurs. The rate of change of current flow through the windings in region 3 may actually be faster than the switching transistors capabilities, and therefore the phase currents are permitted to rise higher than the set point demands would indicate.

The back-EMF and phase current problems which occur in each of the regions shown in FIG. 1A cause the non-linear motor speed/torque characteristics illustrated in the figure. It is a principal object of the present invention to provide electrical monitoring and control circuits to eliminate these motor speed/torque problems, and to produce the operating characteristics shown in FIG. 1B. The circuits hereinafter described accomplish this purpose.

The first feature of the invention relates to the motor speed/torque curve representation in region 2 of FIG. 1A, to convert region 2 to the characteristic illustrated in region 2 of FIG. 1B. The realization of this feature can be accomplished by adding an analog signal proportional to the speed of the motor to the current set point, thereby compensating for variations in motor speed and the effect of such variations on the speed/torque characteristics.

The second feature of the invention relates to the motor speed/torque curve in region 3 of FIG. 1A, which is caused by the operating characteristics of the motor and motor controller circuits, when the chopping transistors are turned on while the motor phase current is higher than the set-point current. This feature is realized by obtaining the value of the instantaneous current in the motor windings (torque) and developing a signal which may be used to control the chopping of the transistors in the motor driver circuit. This may be accomplished by utilizing multiple current sensors and other circuitry associated with the motor windings, but the present invention accomplishes the result with only a single sensor. The realization is possible because the rate of decay of motor phase currents depends upon motor speed, or back-EMF of the motor. Since motor winding resistance and inductance are known, measurement of motor speed enables one to determine the rate of change of motor winding current. Therefore, the invention utilizes a peak track and hold circuit to capture the instantaneous motor current signal and to vary the rate of decay of motor phase current as a function of motor speed, to produce an output signal representative of instantaneous current (torque) in the motor windings. This produces a control signal to be applied to eliminate region 3 of the motor speed/torque curve of FIG. 1A, as will be hereinafter described.

A third feature of the invention is to provide controlled reverse braking of the motor to alleviate stored inertial energy of the motor rotor. Reverse braking is a technique which has been used in the past to slow down or stop a brushless DC motor by causing the back-EMF to produce a current, the current flowing in a reverse direction in the motor to cause the motor to act as a generator. This converts the kinetic energy of the rotor into electrical energy, and slows down the rotor. One prior technique of accomplishing this purpose is to utilize a transistor to cause the reverse current to flow through a power resistor and thereby to convert the electrical energy to heat. Another prior technique for reverse braking is the technique of reversing the commutation sequence in the motor driver circuits to provide a path for reverse current flow in the motor windings; this provides extremely large motor winding currents, and the transistors in the motor driver circuits must be oversized accordingly to handle this current.

The technique of the present invention for controlled reverse braking is similar to the reverse commutation sequence technique, with the additional advantage that the reverse current magnitude is controlled. Instead of simply reversing the commutation sequence, the present invention also modifies the technique of "chopping"; i.e., the technique of turning the motor driver transistors on and off. Instead of turning one transistor on during the entire commutation period and the other transistor selectively on for a portion of the commutation period (2-QUAD), the invention turns both transistors on and off simultaneously (4-QUAD). This permits the reverse current flow in the motor windings to freely circulate via the reverse-biased diodes D.

With reference to the schematic diagrams, whenever possible the circuit components are identified by their actual values; i.e., resistances are shown in ohms or K ohms, and capacitors are shown in microfarads (uf). Likewise, diodes are identified by their actual manufacturer's type designation, it being understood that all diodes are readily commercially available. The various operational amplifiers and other semiconductor circuits which are symbolically illustrated are described in the following specification by manufacturer and manufacturer's type designation, and all such components are also readily commercially available.

Figure 4:
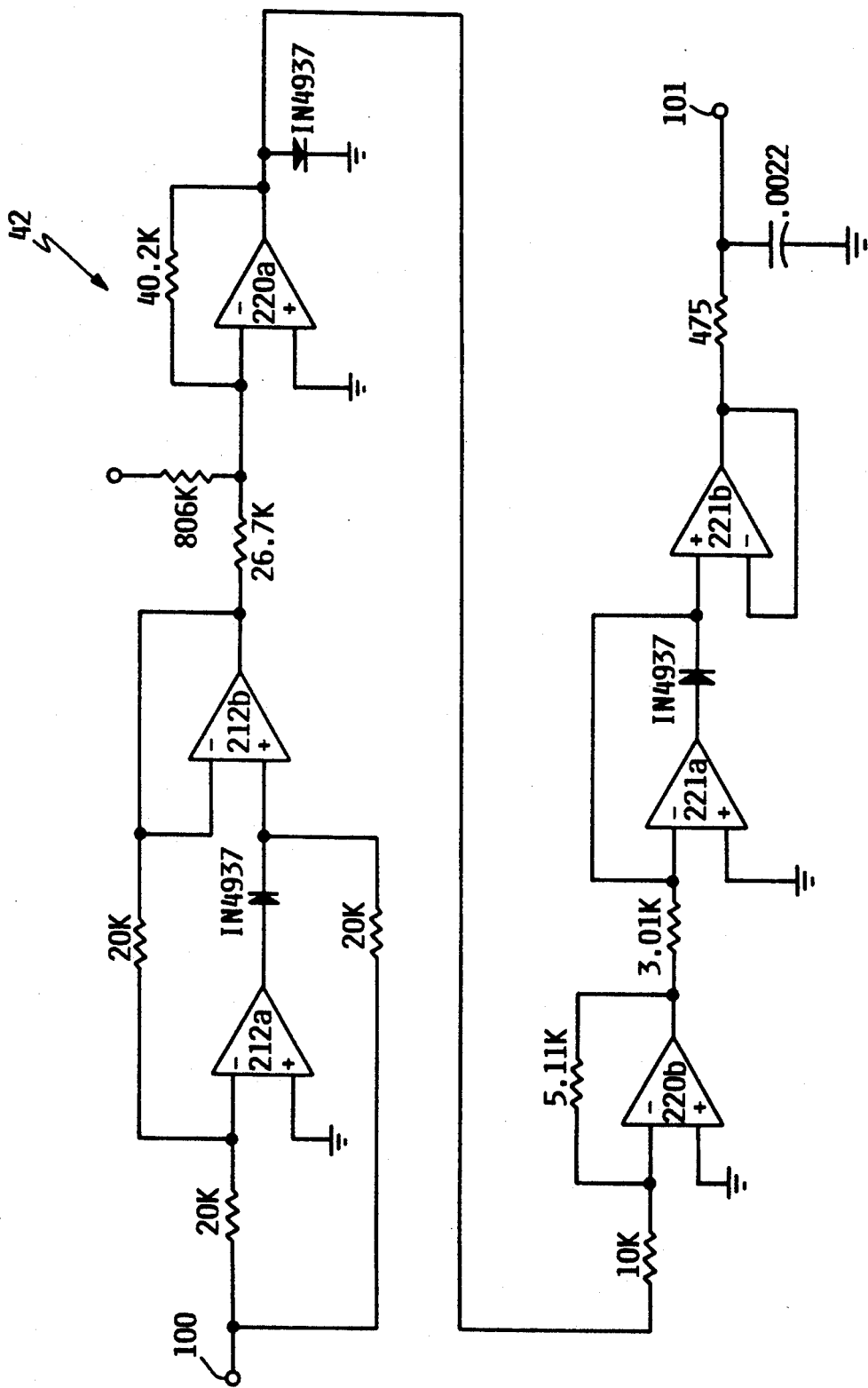
FIG. 4 shows the bus current monitoring circuits.

Referring next to FIG. 4, the current monitoring circuits 42 are shown. These circuits receive an input signal from the current sensor 40, in the range of ±200 millivolts per ampere of motor current sensed. The sensed current may be either positive or negative in direction, depending upon motor operating conditions. This voltage signal is received at terminal 100, in the form of a positive or negative voltage, and operational amplifiers 212a and 212b (Motorola Type MC1558) convert this voltage signal into an absolute value signal of the same magnitude. The signal is then conveyed to operational amplifiers 220a and 220b (National Type LM2904), which add a positive voltage offset to the received signal, thereby raising the "zero" sensed current value to approximately 300 millivolts. The signal is then coupled into operational amplifiers 221a and 221b (National Type LM2904N), which eliminate all negative voltages by clamping the signal to zero volts, and filtering all noise signals above one megahertz (MHZ). The output signal is then delivered to terminal 101, which is the input terminal of peak tracking circuit 46, and also the input terminal of comparator 62.

Figure 5:
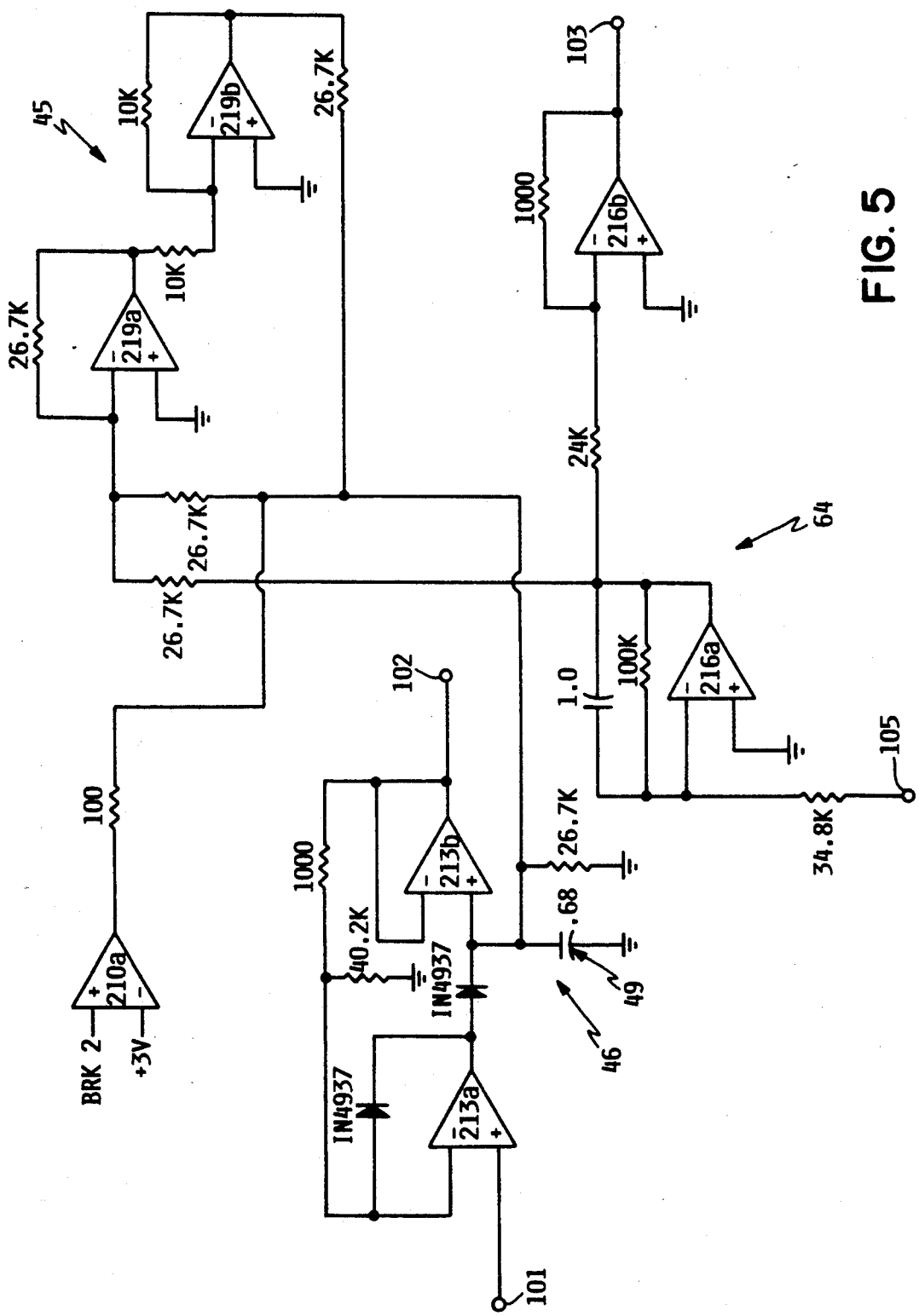
FIG. 5 shows some of the speed detection and phase current simulation circuits.

FIG. 5 shows the peak tracking circuit 46, the drain control circuit 45, and the analog speed averaging circuit 64. The analog speed averaging circuit 64 receives an input signal from the motor control circuit 60, via input terminal 105, and provides an analog output signal which is equal to negative 3.4 volts per 1,000 revolutions per minute (RPM) of the motor. The input signal on terminal 105 to operational amplifiers 216a and 216b, which comprise analog speed averaging circuit 64, is a pulse train from the motor control circuit 60, each pulse having a width of 800 microseconds (us) with eighteen pulses for each revolution of the motor.

Operational amplifier 216a has an output connected to operational amplifier 219a of drain control circuit 45. Circuit 45 has an output to the peak tracking circuit 46, to "drain" the peak detector capacitor 49. The rate of this "drain" is proportional to average motor speed. The peak tracking circuit 46 effectively simulates the circulating current in the motor windings during the "off" time in the motor chopping mode; amplifier 219b provides a drain of the peak detector capacitor 49 proportional to speed, thereby modifying the peak tracking circuit signal to one which is proportional to the instantaneous circulating current in the motor windings. Operational amplifiers 216a and 216b are National Type LM2904N circuits; operational amplifiers 219a and 219b are of the same type designation. Operational amplifiers 213a and 213b are Motorola Type MC1558U. Comparator 210a is a National LM2903N comparator, used to inhibit the "hold" function during "4-QUAD" operation, because during "4-QUAD" operation the current $I_{BUS}$ is equal to the current $I_{PHASE}$. Peak tracking circuit 46 receives a first input at terminal 101 from current monitor circuit 42; it receives a second input from operational amplifier 219b from drain control circuit 45; and it receives a third input from comparator 210a. The output from peak tracking circuit 46 is provided at terminal 102, as an input to summer circuit 65.

Figure 6:
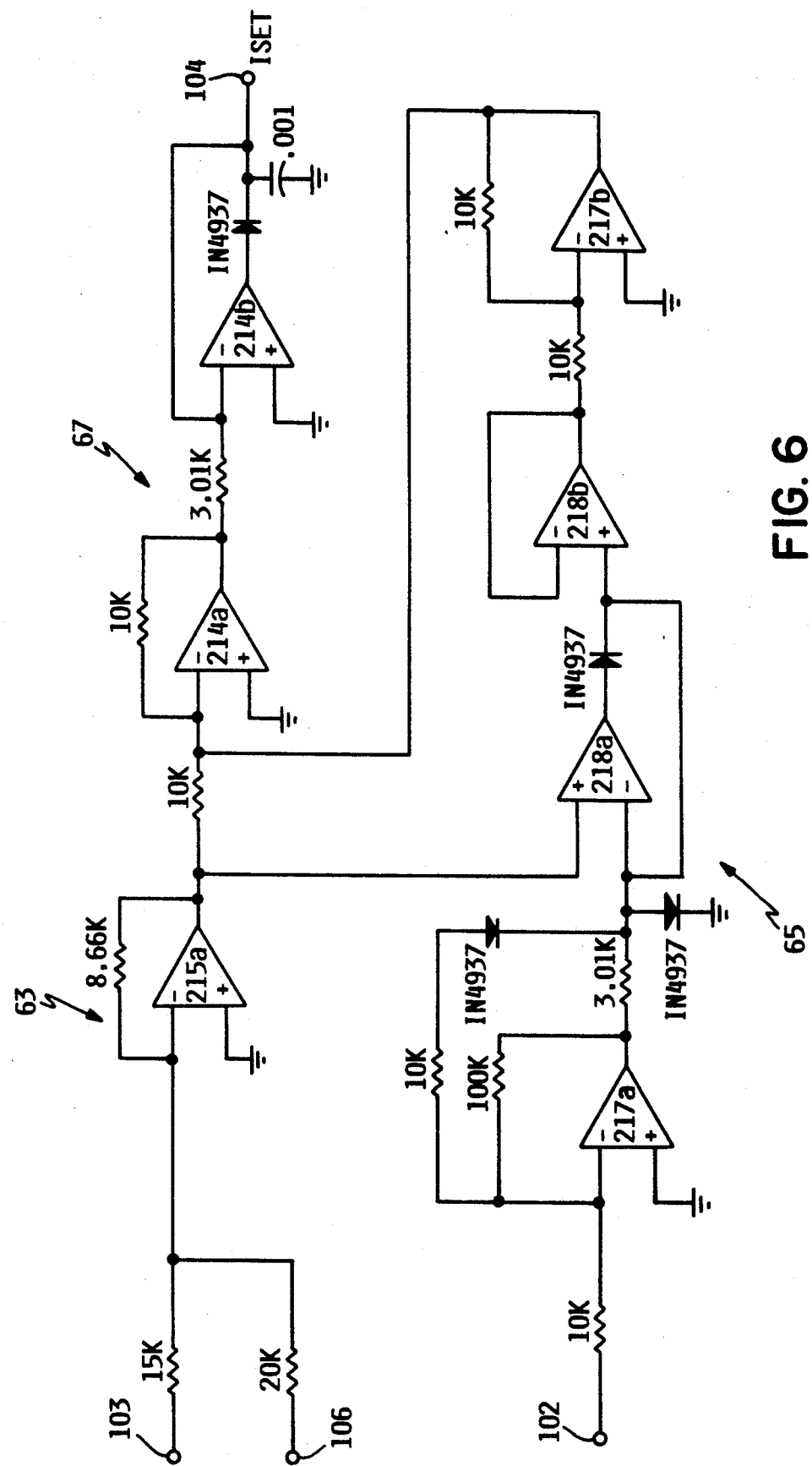
FIG. 6 shows the summing and current error generation circuits.
Figure 7:
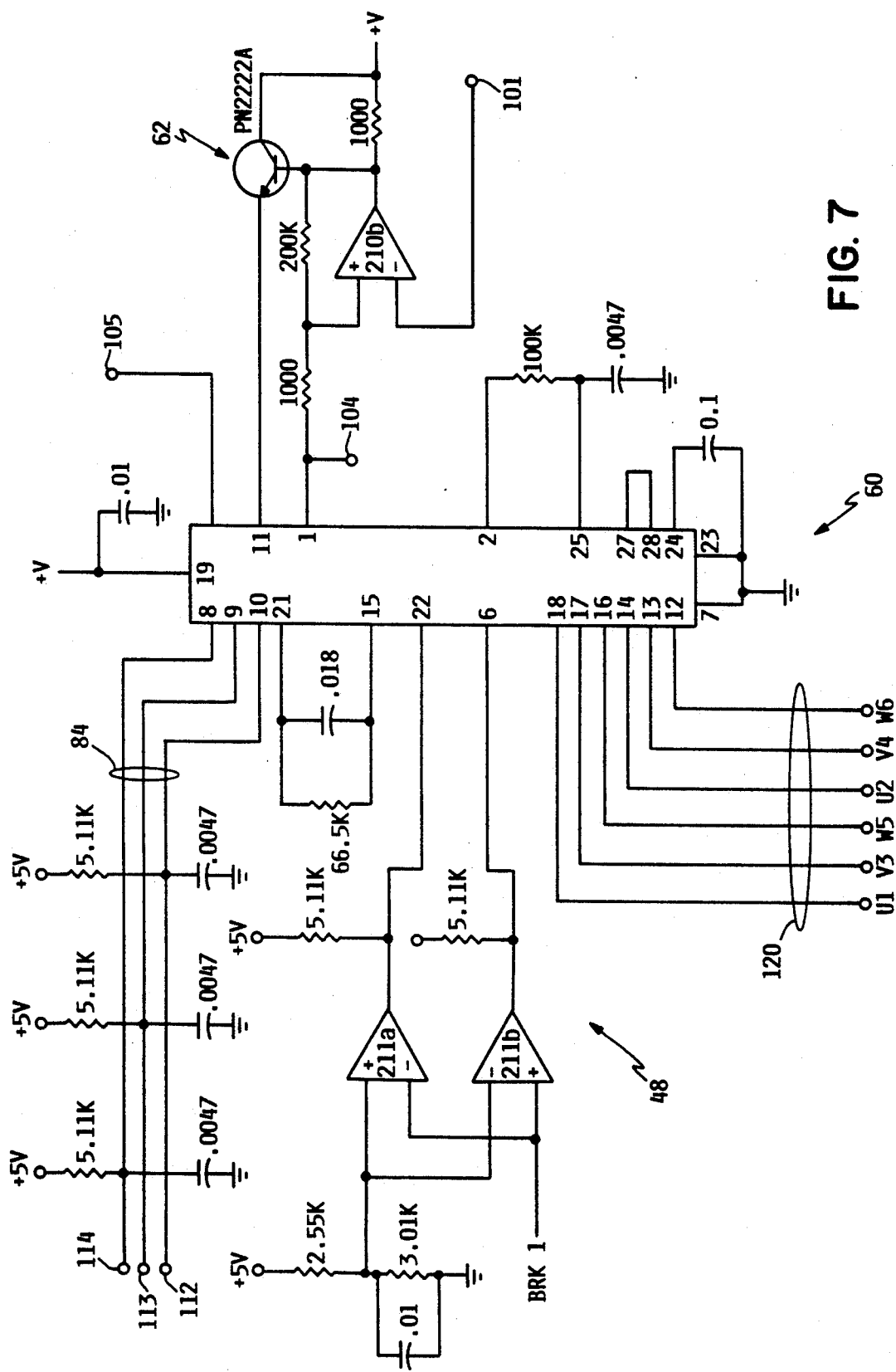
FIG. 7 shows some of the motor control circuits.

The analog speed averaging circuit 64, via operational amplifier 216b, also provides an input 103 to summer amplifier 63, to be added to the signal received at terminal 106 (see FIG. 6). The signal at terminal 106 is the D/A converter output analog signal representative of the set point for the desired motor drive condition. By adding the analog speed averaging circuit signal to the set-point signal, amplifier 215a provides an output signal which increases the set-point signal to thereby correct the average torque at higher speeds. This output signal is connected as an input into summer 65 and summer 67. Amplifier 217a of summer circuit 64 also receives an input from the peak tracking circuit 46, via input terminal 102, and the output of summer 65 is an error signal which is a function of the difference between the instantaneous motor winding signal generated by circuits 45 and 46 and the set-point current value. The output from summer 65 is a signal which is ten times the difference between the instantaneous current signal and the set-point signal. This output signal can only be subtractive and can only be as large as the set-point signal itself. The output from amplifier 217b of summer 65 is coupled as a second input into amplifier 214a of summer 67, which provides a signal which is the sum of the two inputs. The output from amplifier 214b of summer 67 is a signal designated $I_{SET}$, which is the adjusted current (torque) set-point value. This set-point value is provided via terminal 104 to comparator 62 as an input, which is compared with the output from the current monitoring circuits 42, to provide a signal to the motor control circuit 60 (FIG. 7). This signal turns off the drive voltage to the base drive circuits of the motor control circuits, and therefore "chops" the motor drive current.

Figure 9:
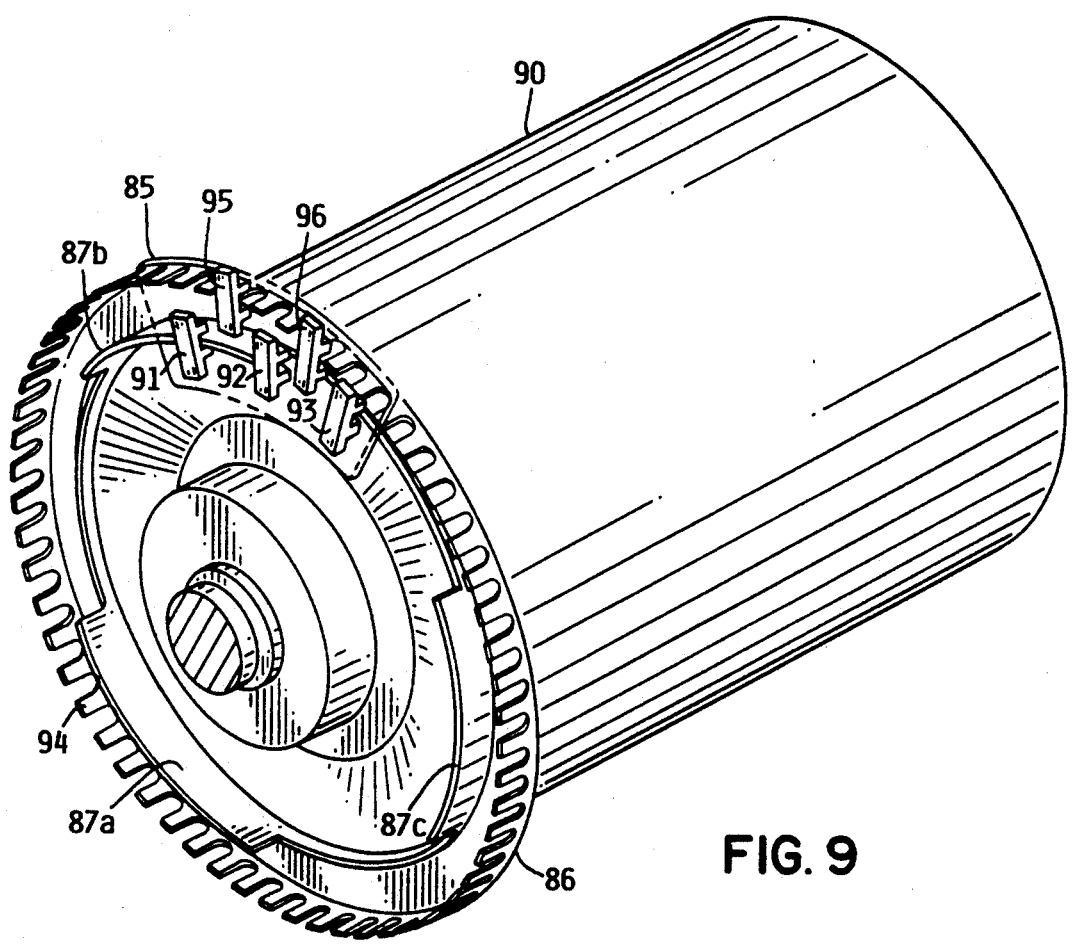
FIG. 9 shows the motor and encoder.

FIG. 7 shows the motor control circuit 60 and some of the reverse braking circuits 48. In addition, motor control circuit 60 receives motor commutation signals via terminals 112, 113 and 114. Referring to FIG. 9, these signals are developed by a light-emitting diode and photo transistor circuit 85 on motor 90, in combination with a toothed wheel 86 affixed to the motor shaft. The wheel 86 has three teeth 87a, 87b, 87c which rotate between each light-emitting diode and photo transistor referred to as optos 91, 92 and 93, thereby providing a commutation signal each time a tooth breaks or unblocks the light path in these devices. Therefore, one revolution of the motor will provide eighteen commutation pulses in a timed sequence, based upon the relative positioning of the opto position relative to the wheel position. Since the three optos are fixedly spaced about the wheel path of rotation, each tooth in the wheel will break the light path of the respective optos in a predetermined sequence corresponding to the commutation sequence of the motor windings. Signals representative of this commutation sequence are coupled into motor control circuit 60 via lines 84. The primary output signals from motor control circuit 60 are six base drive signals 120 which are connected into motor driver circuit 70. These six signals correspond to the base drive signals for transistors U1, U2, V3, V4, W5, and W6 as illustrated in FIG. 3A.

The motor control circuit 60 also receives two inputs from the reverse braking amplifiers 211a and 211b. These amplifiers are activated by a "BRK 1" signal from microprocessor 50, at the time the system senses that reverse braking is required. The two signals into motor control circuit 60 change the operation of motor control 60 from "2-QUAD CHOPPING" to "4-QUAD CHOPPING"; i.e., the normal chopping sequence of motor control 60 (2-QUAD) is to turn on one of the switching transistors during the entire commutation period, and turn on/off the other transistor during the "CHOPPING" portion of the period; during reverse braking the chopping sequence changes to "4-QUAD," wherein both transistors are turned on and off simultaneously during the chopping interval of the commutation period. This simultaneous switching enables currents to flow in the motor windings in a reverse direction from the normal phase currents, to create a braking effect on rotor rotation. Moreover, this current is passed through the current sensor 40, and the magnitude of the current is controlled by the same techniques as the normal phase currents.

Figure 8:
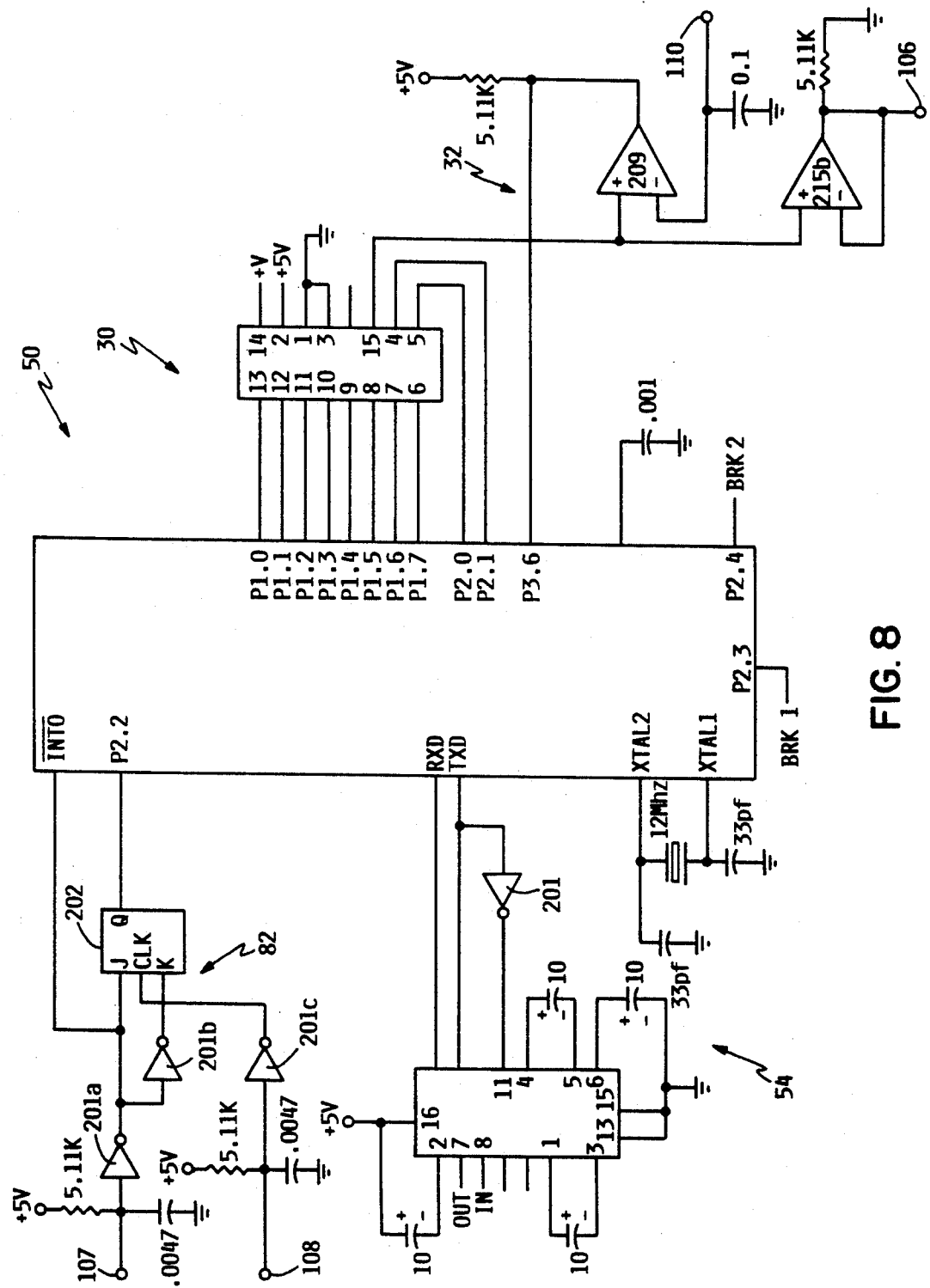
FIG. 8 shows the microprocessing circuits.

FIG. 8 shows the microprocessor 50 and related circuits. Microprocessor 50 calculates a 10-bit digital set-point signal and transmits this signal to D/A converter 30 via ports P 1.0-P 1.7, and P 2.0-P 2.1. The analog signal output from D/A converter 30 is transmitted to summer circuit 63 via output terminal 106, and is also transmitted to comparator 209. The other input to comparator 209 is the operator-adjustable set-point signal via terminal 110. The output from comparator 209 is fed back into microprocessor 50 to update a set-point counter. When the counter-driven set-point value, converted by D/A converter 30, equals the set-point signal on terminal 110, the microprocessor 50 reverses the direction of counting, and thereafter counts up one count and down one count about the set-point equilibrium value until a further discrepency is detected by comparator 209.

Microprocessor 50 also receives binary signals representative of speed and direction of motor 90. These signals originate in the circuit 85 of encoder 80 which is mechanically affixed to motor 90 (see FIG. 9), and are transmitted to speed/direction circuit 82 via terminals 107 and 108. The signals received at terminals 107 and 108 are opto-interrupter signals, wherein the signal on terminal 107 represents the breaking of an opto 95 light beam by a first edge of each of the rotating encoder teeth 94, and the signal at terminal 108 represents the breaking of an opto 96 light beam by the second edge of the rotating encoder teeth 94. The sequence of receiving signals on terminals 107 and 108 provide an indication of the directional rotation of the rotor of motor 90, and measuring the time between signals received by terminal 107 represents the rotational speed of the rotor of motor 90. Signals received at terminal 107 are passed through inverters 201a and 201b to either set or reset flip-flop 202. A signal received at terminal 108 passes through inverter 201c to clock flip-flop 202. The sequence of receipt of these signals will control the state of flip-flop 202, which is coupled into port 2.2 of microprocessor 50; microprocessor 50 is therefore able to determine the sequence of receipt of these signals and the direction of rotation of the rotor. The signal at terminal 107 is also coupled to microprocessor 50 input Type $\overline{\text{INT0}}$. Microprocessor 50 measures the time period between groups of three forward signals received at this input, and is therefore able to calculate the rotational speed of the motor rotor. Inverters 201a, b and c are commercially available circuits, as for example Type SN 54LS14J manufactured by Texas Instruments. Flip-flop 202 is a conventional dual J-K flip-flop such as type SN 54LS107J, manufactured by Texas Instruments.

Figure 10:
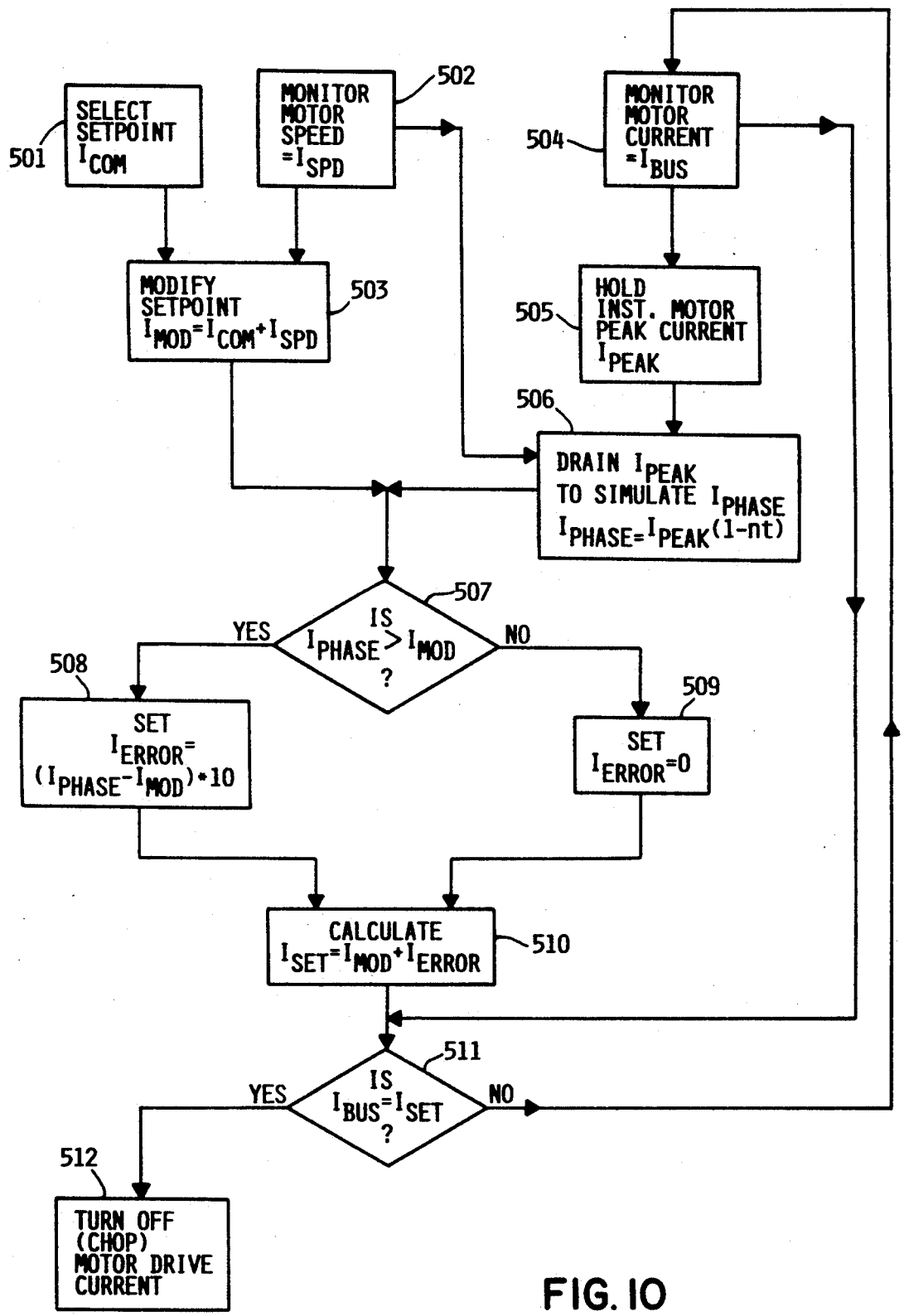
FIG. 10 shows a flow chart of the method of operation.

The method of monitoring the various motor parameters and making the necessary measurements and calculations to achieve the desired motor speed/torque curve of FIG. 1B is shown in FIG. 10. FIG. 10 relates to the parameters which are measured and controlled during each commutation period in order to define the proper chopping interval for current control of the motor. Initially, at 501 the operator manually selects a torque set point by adjustment of a potentiometer or like device; this creates a set-point current $I_{COM}$. The current value $I_{COM}$ ultimately controls, in conjunction with the other monitored parameters, the motor chopping interval. The motor speed is monitored at 502 to develop a resultant current $I_{SPD}$, and a modified set-point current $I_{MOD}$ is developed at 503. The modified current $I_{MOD}$ is made equal to the sum of $I_{COM}+I_{SPD}$.

The instantaneous motor drive current is monitored at 504, to develop a current $I_{BUS}$. The current $I_{BUS}$ is processed by the internal circuitry at 505 to capture and hold the instantaneous motor peak current $I_{PEAK}$. This capture-and-hold function is performed by charging a capacitor to a voltage representative of $I_{PEAK}$. The capacitor is discharged at a control rate by a signal representative of motor speed $I_{SPD}$, to simulate the motor winding phase current $I_{PHASE}$, which occurs at 506. The simulated phase current $I_{PHASE}$ can be developed by discharging the capacitor 49 at a timed rate according to the equation $I_{PHASE}=I_{PEAK}(1-nt)$, where n=a constant, and t=the reciprocal of $I_{SPD}$. This simulated phase current is then used in the remaining steps of the operational method to ultimately control the motor drive current chopping interval.

At 507, the current $I_{PHASE}$ is compared with the current $I_{MOD}$ to determine whether the current $I_{PHASE}$ is greater than the current $I_{MOD}$. If the current $I_{PHASE}$ is greater, a current $I_{ERROR}$ is developed, and the value is set to the difference between the current $I_{PHASE}$ minus $I_{MOD}$, multiplied by a factor of 10 at 508. If the current $I_{PHASE}$ is not greater than $I_{MOD}$ then the current $I_{ERROR}$ is set equal to zero at 509. In either case, at 510 a calculation is made to develop a new current $I_{SET}$, which is set equal to the sum of $I_{MOD}+I_{ERROR}$. At 511, a comparison is made between $I_{BUS}$ and $I_{SET}$. If $I_{BUS}$ is not equal to $I_{SET}$, the monitoring process continues with a return to 504. If $I_{BUS}$ is equal to $I_{SET}$, the motor drive current is chopped at 512, for the remainder of the chopping period. The process then repeats itself for the next and subsequent chopping periods.

The foregoing description sets forth the method of controlling the motor drive current in order to achieve a relatively constant torque over an extremely wide operating speed range. The method compensates for the effects of motor speed variations and the motor back-EMF which is increasingly developed as motor speed increases.

The operation of the motor braking circuits of the present invention can also be explained relative to the definitions of the various currents in the foregoing paragraphs. The motor braking sequence becomes initiated whenever the rate of change of motor speed becomes less than a predetermined constant value; i.e., when the motor decelerates at greater than a predetermined rate. This condition is recognized by the microprocessor 50 when the rate of change of the period measured at $\overline{\text{INT0}}$ exceeds a predetermined negative value. This value is set in the programming of microprocessor 50, and results in the microprocessor 50 initiating both a BRK 1 and a BRK 2 signal. The BRK 1 signal causes the motor commutation sequence to become reversed, and also switches the motor operation to "4-QUAD" operation, thereby causing simultaneous switching of the motor drive transistors. The signal BRK 2 forces the current $I_{PHASE}$ to become set equal to $I_{BUS}$, and the current $I_{COM}$ is substituted by a newly-defined current $I_{BRAKE}$, wherein the current $I_{BRAKE}$ is equal to a constant multiplied by the rotor speed. Therefore, referring to FIG. 10 under these conditions, at 501 the new set point is $I_{BRAKE}$. At 503 the modified value $I_{MOD}$ is made equal to $I_{BRAKE}$ plus $I_{SPD}$. At 505 and 506, $I_{PHASE}$ is forced to be equal to $I_{BUS}$. Therefore, at 507, the comparison becomes a comparison of whether $I_{BUS}$ is greater or less than $I_{MOD}$. Because of the nature of reverse braking $I_{BUS}$ is always less than $I_{MOD}$ at the beginning of the net chopping sequence. This results in boxes 508 and 507 to become ignored, since $I_{ERROR}$ will be zero in either case. At 510, $I_{SET}$ becomes equal to $I_{MOD}$, and at 511, the comparison becomes whether $I_{BUS}$ equals $I_{MOD}$. At 512, when $I_{BUS}$ equals $I_{MOD}$, the motor drive current is turned off, but under "4-QUAD" operating conditions. This means that two motor drive transistors are simultaneously shut off. Referring to FIG. 3A, shutting off two motor drive transistors simultaneously results in the free passage of recirculating motor drive current through the reverse diodes back into the storage capacitors of the voltage recitifier circuits 20. This reverse recirculated current subtracts from the motor drive current to dissipate the energy of deceleration in the form of electrical energy stored in the storage capacitors of the rectifier, and essentially converts the rotor inertial energy into stored electrical energy.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for controlling the driver bus current in a DC motor drive system by selectively controlling the switching intervals of a plurality of inverter switches coupled to the motor field windings, comprising:

means for manually selecting a set-point torque value defining the desired motor output torque;

means for monitoring the instantaneous motor driver bus current and developing a motor driver bus current control signal therefrom; means for monitoring the motor rotor rotational speed and developing a motor rotor speed control signal therefrom;

means for modifying said set-point torque value, responsive to said motor rotor speed control signal, to produce a modified set-point torque value;

means for simulating motor winding phase current by utilizing said motor driver bus current and rotor speed control signals to generate a simulated motor phase current signal;

means for utilizing said modified set-point torque value and said simulated motor phase current signal, and means for developing an inverter control signal therefrom; and means for turning off said inverter switches with said inverter control signal.

2. The apparatus of claim 1, wherein said means for monitoring instantaneous motor driver bus current and developing a motor driver bus current control signal therefrom further comprises a current sensor and first circuit means for developing a signal $I_{BUS}$ representative or motor driver bus current.

3. The apparatus of claim 2, wherein said means for manually selecting a set-point torque value further comprises second circuit means for developing a signal $I_{COM}$ representative of said set-point torque value.

4. The apparatus of claim 3, wherein said means for monitoring motor rotor speed and developing a motor rotor speed control signal therefrom further comprises third circuit means for developing a signal $I_{SPD}$ representative of the motor rotor speed.

5. The apparatus of claim 4, wherein said means for modifying said set-point torque value further comprises fourth circuit means for developing a signal $I_{MOD}$ which is the sum of $I_{COM}$ and $I_{SPD}$.

6. The apparatus of claim 5, wherein said means for monitoring the instantaneous motor driver bus current and developing a motor driver bus current control signal therefrom further comprises fifth circuit means coupled to receive said $I_{BUS}$ signal and for developing a signal $I_{PEAK}$ representative of the peak value of $I_{BUS}$.

7. The apparatus of claim 6, wherein said means for monitoring the instantaneous motor driver bus current and developing a motor driver bus current control signal therefrom further comprises sixth circuit means coupled to receive said $I_{PEAK}$ signal and said $I_{SPD}$ signal, for developing a signal $I_{PHASE}$ representative of said motor winding phase current.

8. The apparatus of claim 7, wherein said means for utilizing said modified set-point torque value and said simulated motor phase current signal further comprises seventh circuit means for comparing said $I_{PHASE}$ signal with said $I_{MOD}$ signal.

9. The apparatus of claim 8, wherein said means for utilizing said modified set-point torque value and said simulated motor phase current signal further comprises eighth circuit means for comparing said $I_{PHASE}$ to said $I_{MOD}$, and ninth circuit means for developing an error signal $I_{ERROR}$ if said $I_{PHASE}$ is greater than said $I_{MOD}$, the magnitude of said $I_{ERROR}$ being proportional to the difference between said $I_{PHASE}$ and said $I_{MOD}$; and tenth circuit means for developing an error signal $I_{ERROR}$ equal to zero if said $I_{PHASE}$ is not greater than said $I_{MOD}$.

10. The apparatus of claim 9, wherein said means for utilizing said modified set-point torque value and said simulated motor phase current signal further comprises eleventh circuit means coupled to receive said $I_{MOD}$ signal and said $I_{ERROR}$ signal, and for developing a signal $I_{SET}$ representative of the sum of said $I_{MOD}$ and said $I_{ERROR}$.

11. The apparatus of claim 10, wherein said means for turning off said inverter switches further comprises twelfth circuit means for comparing said $I_{BUS}$ signal with said $I_{SET}$ signal, and for generating a turn-off signal to said inverter switches when said $I_{BUS}$ equals said $I_{SET}$.

12. The apparatus of claim 1, further comprising means for calculating the rate of change of motor rotor speed, and means for comparing the calculated rate of change against a predetermined value.

13. The apparatus of claim 12, further comprising means for generating a BRK 1 and a BRK 2 signal when the means for comparing shows the calculated rate of change to be equal to or greater than the predetermined value.

14. The apparatus of claim 13, further comprising first means for receiving said BRK 1 signal and means for reversing the commutation sequence of said motor in response thereto.

15. The apparatus of claim 14, further comprising second means for receiving said BRK 2 signal and means responsive thereto for setting said simulated motor phase current signal equal to said motor driver bus current control signal.

16. The apparatus of claim 15, further comprising further means for changing said set-point torque value to a value equal to a constant multiplied by said motor rotor rotational speed control signal.

17. The apparatus of claim 16, wherein said means for modifying said set-point torque value, responsive to said motor rotor speed control signal, further comprises means for developing a modified signal $I_{MOD}$ equal to the sum of said motor rotor speed control signal and said changed set-point torque value.

18. The apparatus of claim 17, wherein said means for simulating phase current further comprises means for simulating a phase current equal to said instantaneous motor driver bus current.

19. The apparatus of claim 18, wherein said means for utilizing said modified set-point torque value and said simulated motor phase signal further comprises means for utilizing said $I_{MOD}$ signal and said instantaneous motor driver bus current, and said means for developing an inverter control signal comprises means for turning off said inverter switches when said $I_{MOD}$ signal equals said instantaneous motor driver bus current.

20. In a DC motor drive system having variable loading conditions and comprising semiconductor switches interposed between a direct current supply and the DC motor field windings, the improvement in controlling said switches to provide a constant motor torque output corresponding to a manually-set torque set-point value, comprising:

a) means for monitoring the DC motor driver bus peak current and generating a first control signal ($I_{PEAK}$) responsive thereto;

b) means for monitoring the DC motor rotor speed and generating a second control signal ($I_{SPD}$) responsive thereto;

c) means for generating a third control signal ($I_{MOD}$) by additively combining said second control signal with said set-point value;

d) means for generating a fourth control signal ($I_{PHASE}$) by linearly reducing said first control signal over time;

e) means for comparing said third control signal and said fourth control signal, including means for generating an error signal if said fourth control signal exceeds said third control signal;

f) means for generating a fifth control signal by additively combining said error signal and said third control signal; and g) means for shutting off said switches when said fifth control signal becomes equal to the motor field winding current.

21. A method for controlling a DC motor drive system to produce a constant output torque under variable loading conditions, responsive to a preselected set-point torque, by controlling the DC motor driver bus current $I_{BUS}$, comprising the steps of:

a) selecting a set-point current $I_{COM}$ corresonding to said preselected set-point torque;

b) monitoring the instantaneous motor drive bus current $I_{BUS}$;

c) monitoring the motor rotational speed and developing a current $I_{SPD}$ responsive thereto;

d) modifying $I_{COM}$ in correspondence with $I_{SPD}$ to form $I_{MOD} = I_{COM} + I_{SPD}$;

e) simulating the motor phase current $I_{PHASE}$ by linearly reducing the peak value of $I_{BUS}$ at a time rate corresponding to $I_{SPD}$;

f) comparing $I_{PHASE}$ with $I_{MOD}$ and developing an error signal proportional to the difference ($I_{PHASE} - I_{MOD}$);

g) forming a new set-point signal $I_{SET}$ equal to the sum of $I_{MOD}$ plus said error signal; and h) turning off the current $I_{BUS}$ when $I_{SET}$ equals $I_{BUS}$.

22. The method of claim 21, wherein the step of simulating the motor phase current $I_{PHASE}$ further comprises capturing the peak value $I_{PEAK}$ of $I_{BUS}$, and linearly reducing $I_{PEAK}$ to form $I_{PHASE}$ according to the relation $I_{PHASE} = I_{PEAK}(1 - nt)$ where "n" is a constant value and "t" is the reciprocal of $I_{SPD}$.

23. The method of claim 22, wherein the step of comparing $I_{PHASE}$ with $I_{MOD}$ further comprises developing a zero error signal $I_{ERROR} = 0$ if $I_{PHASE}$ is not greater than $I_{MOD}$, and developing an error signal $I_{ERROR} = (I_{PHASE} - I_{MOD}) \times 10$ if $I_{PHASE}$ is greater than $I_{MOD}$.

24. The method of claim 23, wherein the step of turning off the current $I_{BUS}$ further comprises turning off inverter driver transistors in the DC motor drive system.

25. A method for controlling a DC motor drive system under variable loading conditions, comprising the steps of:

a) manually setting a set-point motor torque output value $I_{COM}$;

b) monitoring the instantaneous motor driver bus current $I_{BUS}$;

c) monitoring the motor rotational speed $I_{SPD}$;

d) modifying the set-point value $I_{COM}$ in correspondence with increases in motor rotational speed $I_{SPD}$, to form a modified set-point value $I_{MOD}$;

e) capturing the peak value $I_{PEAK}$ of the motor driver bus current $I_{BUS}$;

f) linearly reducing the captured peak value at a time rate corresponding to motor rotational speed to simulate a motor phase current $I_{PHASE}$;

g) comparing the simulated motor phase current $I_{PHASE}$ with $I_{MOD}$, and developing an error signal if the simulated motor phase current is greater than the modified set-point value, the magnitude of the error signal being substantially greater than the difference between the simulated motor phase current and the modified set-point value;

h) adding the error signal to the $I_{MOD}$ to create a new signal $I_{SET}$;

i) comparing the new signal $I_{SET}$ to the driver bus current $I_{BUS}$; and j) shutting off the driver bus drive current $I_{BUS}$ when the driver bus current signal $I_{BUS}$ becomes equal to the new signal $I_{SET}$.

* * * * *